US012067953B2

(12) United States Patent
Ishii

(10) Patent No.: US 12,067,953 B2
(45) Date of Patent: Aug. 20, 2024

(54) DISPLAY DEVICE AND SOURCE DRIVER

(71) Applicant: LAPIS TECHNOLOGY CO., LTD., Yokohama (JP)

(72) Inventor: Hiroaki Ishii, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 0 days.

(21) Appl. No.: 18/371,550

(22) Filed: Sep. 22, 2023

(65) Prior Publication Data

US 2024/0112647 A1 Apr. 4, 2024

(30) Foreign Application Priority Data

Sep. 29, 2022 (JP) ................................ 2022-156222

(51) Int. Cl.
*G09G 3/36* (2006.01)

(52) U.S. Cl.
CPC ......... *G09G 3/3688* (2013.01); *G09G 3/3677* (2013.01); *G09G 2310/0278* (2013.01); *G09G 2310/0291* (2013.01)

(58) Field of Classification Search
CPC ............... G09G 3/3688; G09G 3/3677; G09G 2310/0278; G09G 2310/0291
See application file for complete search history.

(56) References Cited

U.S. PATENT DOCUMENTS 11,799,431 B2 * 10/2023 Jeong .................... H03F 3/3028
2013/0088473 A1 * 4/2013 Tsuchi ................. G09G 3/3291 330/257
2013/0194251 A1 * 8/2013 Cheng .................. G09G 3/3648 345/92
2020/0294453 A1 * 9/2020 Watanabe ............ G09G 3/2092

FOREIGN PATENT DOCUMENTS

JP H05299986 A 11/1993

* cited by examiner

*Primary Examiner* — Lixi C Simpson
(74) *Attorney, Agent, or Firm* — VOLENTINE, WHITT & FRANCOS, PLLC

(57) ABSTRACT

A source driver includes an output buffer. The output buffer includes: an amplifying unit; a first current control unit that includes a first constant current source and a second constant current source; and a second current control unit that includes a third constant current source and a fourth constant current source. The first constant current source is disposed on a first supply line. The second constant current source is disposed on a second supply line. The third constant current source is connected in parallel to the first supply line, supplies the first power supply voltage to the amplifying unit, and allows turning on and off the supply. The fourth constant current source is connected in parallel to the second supply line, supplies the second power supply voltage to the amplifying unit, and allows turning on and off the supply.

6 Claims, 8 Drawing Sheets

DISPLAY DEVICE AND SOURCE DRIVER

CROSS-REFERENCE TO RELATED APPLICATION

This application is based upon and claims the benefit of priority from the prior Japanese Patent Application No. 2022-156222 filed on Sep. 29, 2022, the entire contents of which are incorporated herein by reference.

BACKGROUND

1. Technical Field

The disclosure relates to a display device and a source driver.

2. Description of the Related Art

In small-sized liquid crystal display devices for in-vehicle use and the like, a Gate In Panel (GIP) that has functions equivalent to those of a gate driver mounted on glass has increasingly been employed, and cases in which a source driver generates a control signal for GIP has been increasing. The control signal for GIP has a large amplitude and a large peak current compared with an output signal of a conventional source driver, causing the generation of noise, such as Electro Magnetic Interference (EMI).

In order to attempt the reduction of such noise, a configuration in which a buffer for restricting the amount of current is disposed on an output circuit is employed. For example, in order to avoid malfunction due to power source noise in a CMOS output circuit constituted of two or more transistors that perform a switching operation, a configuration in which the amount of current to an output terminal is restricted by connecting an inverter having weak current drive capability to an input portion of a CMOS inverter has been proposed (for example, JP-A-5-299986).

SUMMARY

In the configuration in which the buffer for restricting the amount of current is employed, a peak current, that is, the amount of instantaneous variation in current, which causes noise generation, can be suppressed. However, in inverse proportion to the suppression of the peak current, a problem has been caused in which a slew rate of an amplifier circuit that constitutes an output unit decreases, resulting in the cause of output delay.

The disclosure has been made in consideration of the problems, and an object of the disclosure is to provide a display device that allows suppressing the amount of instantaneous variation in current and the magnitude of noise generated due to the amount of instantaneous variation in current while suppressing a decrease in slew rate of an amplifier circuit.

According to the disclosure, a display device comprises: a display panel that includes a plurality of data lines, a plurality of gate lines, and a plurality of pixel portions disposed in a matrix at respective intersecting portions between the plurality of data lines and the plurality of gate lines; a display controller that outputs a video data signal indicating video displayed on the display panel; a gate driver that supplies a gate signal to the plurality of gate lines; and a source driver that receives the video data signal from the display controller, supplies a gradation voltage signal to the plurality of pixel portions via the plurality of data lines based on the video data signal, and supplies a gate control signal for controlling an operation of the gate driver to the gate driver, wherein the source driver includes: a gate control unit that generates the gate control signal; and an output buffer that amplifies the gate control signal and outputs the amplified gate control signal, and the output buffer includes: an amplifying unit that operates in response to application of a first power supply voltage and a second power supply voltage, amplifies the gate control signal, and outputs the amplified gate control signal; a first current control unit that includes a first constant current source and a second constant current source, the first constant current source being disposed on a first supply line that supplies the first power supply voltage to the amplifying unit, the second constant current source being disposed on a second supply line that supplies the second power supply voltage to the amplifying unit; and a second current control unit that includes a third constant current source and a fourth constant current source, the third constant current source being connected in parallel to the first supply line, supplying the first power supply voltage to the amplifying unit, and allowing turning on and off the supply, the fourth constant current source being connected in parallel to the second supply line, supplying the second power supply voltage to the amplifying unit, and allowing turning on and off the supply.

According to the disclosure, a source driver that is connected to a display panel, receives supply of a video data signal from a display controller, supplies a gradation voltage signal to a plurality of pixel portions via a plurality of data lines based on the video data signal, and supplies a gate control signal to a gate driver, the display panel including the plurality of data lines, a plurality of gate lines, and the plurality of pixel portions disposed in a matrix at respective intersecting portions between the plurality of data lines and the plurality of gate lines, the gate control signal controlling an operation of the gate driver that supplies a gate signal to the plurality of gate lines, the source driver comprises: a gate control unit that generates the gate control signal; and an output buffer that amplifies the gate control signal and outputs the amplified gate control signal, wherein the output buffer includes: an amplifying unit that operates in response to application of a first power supply voltage and a second power supply voltage, amplifies the gate control signal, and outputs the amplified gate control signal; a first current control unit that includes a first constant current source and a second constant current source, the first constant current source being disposed on a first supply line that supplies the first power supply voltage to the amplifying unit, the second constant current source being disposed on a second supply line that supplies the second power supply voltage to the amplifying unit; and a second current control unit that includes a third constant current source and a fourth constant current source, the third constant current source being connected in parallel to the first supply line, supplying the first power supply voltage to the amplifying unit, and allowing turning on and off the supply, the fourth constant current source being connected in parallel to the second supply line, supplying the second power supply voltage to the amplifying unit, and allowing turning on and off the supply.

BRIEF DESCRIPTION OF THE DRAWINGS

Features of the disclosure will be described below with reference to the accompanying drawings.

DETAILED DESCRIPTION

Figure 1:
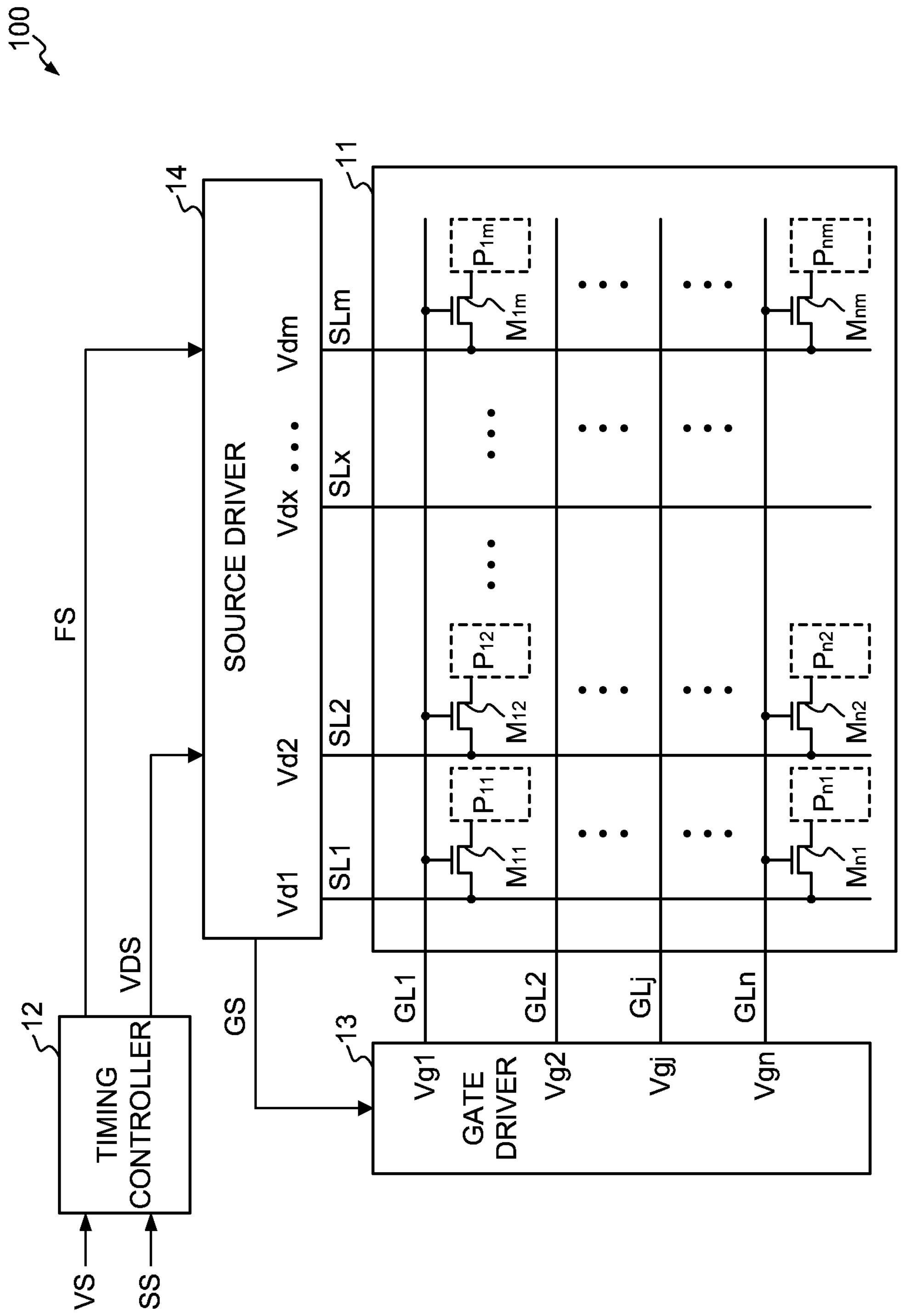
FIG. 1 is a block diagram illustrating a configuration of a display device of the embodiment.

Preferred embodiments of the disclosure will be described in detail below. Note that the same reference numerals are given to substantially identical or equivalent parts in the description in the following embodiments and the accompanying drawings.

The display device according to the disclosure allows suppressing the amount of instantaneous variation in current and the magnitude of noise generated due to the amount of instantaneous variation in current while suppressing a decrease in slew rate of an amplifier circuit.

FIG. 1 is a block diagram illustrating a configuration of a display device 100 according to the disclosure. The display device 100 is a liquid crystal display device of an active matrix drive system. The display device 100 includes a display panel 11, a timing controller 12, a gate driver 13, and a source driver 14.

The display panel 11 is constituted of a semiconductor substrate on which a plurality of pixel portions $P_{11}$ to $P_{nm}$ and a plurality of pixel switches $M_{11}$ to $M_{nm}$ (n, m: natural numbers equal to or more than 2) are arranged in a matrix. The display panel 11 has n gate lines GL1 to GLn that are scanning lines each of which extends in a horizontal direction and m source lines SL1 to SLm that are data lines and disposed to intersect with the n gate lines GL1 to GLn. The pixel portions $P_{11}$ to $P_{nm}$ and the pixel switches $M_{11}$ to $M_{nm}$ are disposed at intersecting portions between the gate lines GL1 to GLn and the source lines SL1 to SLm.

The pixel switches $M_{11}$ to $M_{nm}$ are controlled to be turned on or off according to gate signals Vg1 to Vgn supplied from the gate driver 13.

The pixel portions $P_{11}$ to $P_{nm}$ receive supply of gradation voltages (drive voltages) corresponding to video data from the source driver 14. Specifically, gradation voltage signals Vd1 to Vdm are output to the source lines SL1 to SLm from the source driver 14, and the gradation voltage signals Vd1 to Vdm are applied to the pixel portions $P_{11}$ to $P_{nm}$ when the respective pixel switches $M_{11}$ to $M_{nm}$ are turned on. This charges each pixel electrode of the pixel portions $P_{11}$ to $P_{nm}$ and controls luminance.

The pixel portions $P_{11}$ to $P_{nm}$ include transparent electrodes respectively connected to the source lines SL1 to SLm via the pixel switches $M_{11}$ to $M_{nm}$ and liquid crystals enclosed between the transparent electrode and a counter substrate. The counter substrate is disposed to be opposed to the semiconductor substrate and includes one transparent electrode formed on the whole surface. Displaying is performed by a change in transmittance of the liquid crystals according to an electric potential difference between the gradation voltage (drive voltage) applied to the pixel portions $P_{11}$ to $P_{nm}$ and a counter substrate voltage with respect to a backlight inside the display device 100.

The timing controller 12 generates a series of pixel data pieces PD (serial signal) indicating a luminance level of each pixel in, for example, 256-level luminance gradations in 8-bit, based on video data VS. Further, the timing controller 12 generates a clock signal CLK of an embedded clock system having a constant clock cycle based on a synchronizing signal SS. The timing controller 12 generates a video data signal VDS that is a serial signal in which the series of pixel data pieces PD and the clock signal CLK are integrated and supplies the video data signal VDS to the source driver 14 to perform a display control of the video data. The video data signal VDS is constituted as a video data signal serialized according to the number of transmission paths for each predetermined number of source lines.

In the embodiment, n pixel data piece groups, each of which is constituted of m pixel data pieces PD, serially continue to configure the video data signal VDS for one frame. Each of the n pixel data piece groups is a pixel data piece group constituted of pixel data pieces corresponding to the gradation voltages to be supplied to the respective pixels on one horizontal scanning line (that is, each of the gate lines GL1 to GLn). By an operation of the source driver 14, based on the m×n pixel data pieces PD, the gradation voltage signals Vd1 to Vdm to be supplied to n×m pixel portions (that is, the pixel portions $P_{11}$ to $P_{nm}$) are applied via the source lines SL1 to SLm.

The timing controller 12 generates a frame synchronizing signal FS that indicates timing for each frame of the video data signal VDS based on the synchronizing signal SS and supplies the frame synchronizing signal FS to the source driver 14.

The gate driver 13 is mounted on a glass substrate that constitutes the display panel 11 using a Gate In Panel (GIP) technique. The gate driver 13 receives supply of the gate control output GS from the source driver 14 and sequentially supplies the gate signals Vg1 to Vgn to the gate lines GL1 to GLn based on clock timing included in the gate control output GS. By the supply of the gate signals Vg1 to Vgn, the pixel portions $P_{11}$ to $P_{nm}$ are selected for each pixel row. Then, the gradation voltage signals Vd1 to Vdm are applied to the selected pixel portions from the source driver 14, thereby performing write of the gradation voltages to the pixel electrodes.

In other words, by the operation of the gate driver 13, m pixel portions arranged along an extending direction of the gate lines (that is, laterally in a line) are selected as supply targets of the gradation voltage signals Vd1 to Vdm. The source driver 14 applies the gradation voltage signals Vd1 to Vdm to the selected pixel portions arranged laterally in a line and causes the pixel portions to display colors corresponding to the voltages. By repeating the application of the gradation voltage signals Vd1 to Vdm in the extending direction of the source lines (that is, a longitudinal direction) while selectively switching the pixel portions for one lateral line selected as the supply targets of the gradation voltage signals Vd1 to Vdm, screen display for one frame is performed.

The source driver 14 receives supply of the video data signal VDS from the timing controller 12 and generates the gradation voltage signals Vd1 to Vdm corresponding to multi-value level gradation voltages according to a gradation count indicated in the video data signal VDS. The source driver 14 applies the gradation voltage signals Vd1 to Vdm to the pixel portions $P_{11}$ to $P_{nm}$ via the source lines SL1 to SLm.

Further, the source driver 14 generates the gate control output GS that controls the operation timing of the gate driver 13 based on the frame synchronizing signal FS and supplies the gate control output GS to the gate driver 13.

Figure 2:
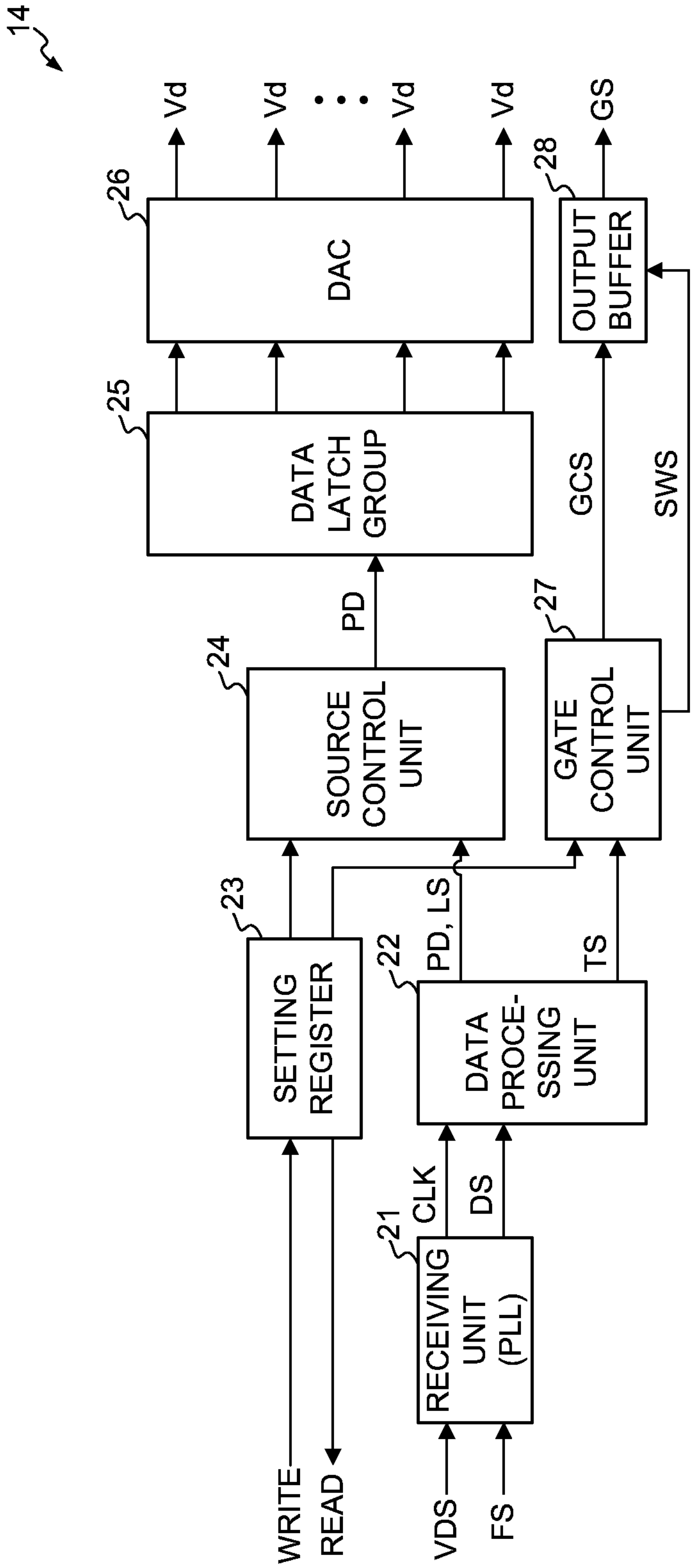
FIG. 2 is a block diagram illustrating a configuration of a source driver of the embodiment.

FIG. 2 is a block diagram illustrating a configuration of the source driver 14 of the embodiment. The source driver 14 includes a receiving unit (PLL) 21, a data processing unit 22, a setting register 23, a source control unit 24, a data latch group 25, a DA converter 26 (DAC 26), a gate control unit 27, and an output buffer 28.

The receiving unit 21 receives the video data signal VDS and the frame synchronizing signal FS supplied from the timing controller 12. The receiving unit 21 includes a Phase Locked Loop (PLL) circuit and generates the clock signal CLK based on the video data signal VDS and the frame synchronizing signal FS. Further, the receiving unit 21 generates a serial data signal DS synchronized with the clock signal CLK and supplies the data signal DS to the data processing unit 22.

The data processing unit 22 performs serial parallel conversion on the data signal DS, generates parallel pixel data pieces PD, and supplies the pixel data pieces PD to the source control unit 24. Further, the data processing unit 22 generates a horizontal synchronizing signal LS based on the data signal DS and supplies the horizontal synchronizing signal LS to the source control unit 24.

Further, the data processing unit 22 generates a timing control signal TS used for the control of the gate driver 13 based on the clock signal CLK and supplies the timing control signal TS to the gate control unit 27.

The setting register 23 is a register circuit that stores setting data related to the operation of the source driver 14. In response to a write operation from the timing controller 12, the setting data is written into the setting register 23. In response to a read operation by the timing controller 12, various data stored in the setting register 23 is read out to the timing controller 12.

The source control unit 24 reads out the setting data stored in the setting register 23 and controls the operation of the data latch group 25 based on the read setting data. For example, the source control unit 24 supplies the parallel pixel data pieces PD supplied from the data processing unit 22 to the data latch group 25 and causes respective data latches constituting the data latch group 25 to sequentially store the pixel data pieces PD using the horizontal synchronizing signal LS as a capturing clock.

The data latch group 25 and the DA converter 26 are gradation voltage output units that output the gradation voltage signals in response to the control of the source control unit 24. The data latch group 25 is constituted of a plurality of latch circuits that capture the pixel data pieces PD. The plurality of latch circuits include, for example, a first latch circuit and a second latch circuit. The first latch circuit captures the pixel data pieces PD for one row each time. The second latch circuit captures the pixel data pieces PD stored in the first latch circuit according to the rise timing of the horizontal synchronizing signal LS.

The DA converter 26 selects the gradation voltages corresponding to the pixel data pieces PD output from the data latch group 25 and performs digital-to-analog conversion to generate analog gradation voltage signals Vd. The generated analog gradation voltage signals Vd are amplified by an output amplifier (not illustrated in FIG. 2) to be output to the source lines SL1 to SLm of the display panel 11.

The gate control unit 27 generates a gate control signal GCS based on the timing control signal TS supplied from the data processing unit 22 and supplies the gate control signal GCS to the output buffer 28. Further, the gate control unit 27 generates a slew rate switching signal SWS for switching the slew rate of an amplifier circuit that constitutes the output buffer 28 based on the timing control signal TS and supplies the slew rate switching signal SWS to the output buffer 28.

The output buffer 28 amplifies the gate control signal GCS supplied from the gate control unit 27 and outputs the amplified gate control signal GCS as the gate control output GS. The gate control output GS is supplied to the gate driver 13.

Figure 3A:
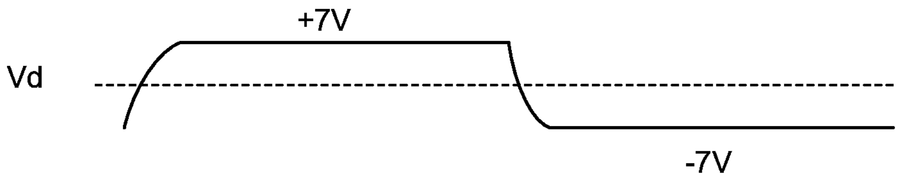
FIG. 3A is a diagram illustrating a signal waveform of a source driver output.
Figure 3B:
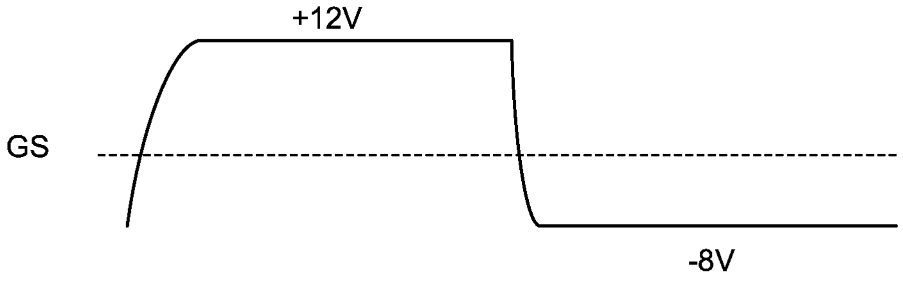
FIG. 3B is a diagram illustrating a signal waveform of a gate control output.

FIGS. 3A and 3B are diagrams illustrating a comparison between a signal waveform of the gradation voltage signal Vd output from the DA converter 26 and a signal waveform of the gate control output GS output from the output buffer 28. As illustrated in FIG. 3A, the gradation voltage signal Vd as an output of the source driver 14 is a signal having a voltage of ±7 V.

In contrast to this, as illustrated in FIG. 3B, the gate control output GS is a signal having a voltage value of −8 V to +12 V and has a large amplitude compared with the gradation voltage signal Vd. In view of this, a peak current generated in response to the rise of the gate control output GS also increases, causing the generation of noise, such as Electro Magnetic Interference (EMI). The output buffer 28 of the embodiment has a configuration for suppressing the generation of such a peak current.

Figure 4:
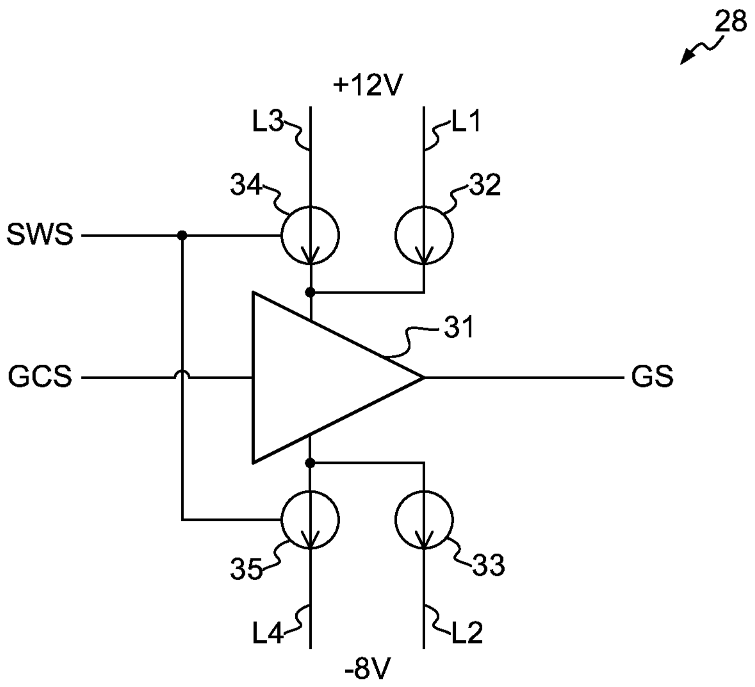
FIG. 4 is a simplified circuit diagram illustrating a configuration of an output buffer of the embodiment.

FIG. 4 is a simplified diagram illustrating the configuration of the output buffer 28 of the embodiment. The output buffer 28 includes an amplifier circuit 31, base constant current sources 32 and 33, and boosting constant current sources 34 and 35.

The amplifier circuit 31 receives input of the gate control signal GCS at an input terminal, amplifies the gate control signal GCS, and outputs the amplified signal as the gate control signal GCS.

The base constant current source 32 is disposed on a voltage supply line L1 that supplies a power supply voltage of +12 V (positive-side power supply voltage) to the amplifier circuit 31. The base constant current source 33 is disposed on a voltage supply line L2 that supplies a power supply voltage of −8 V (negative-side power supply voltage) to the amplifier circuit 31. The base constant current sources 32 and 33 have a function to restrict a current flowing through the amplifier circuit 31 at the rise of the gate control output GS (hereinafter referred to as a peak current) to a predetermined current value. That is, the base constant current sources 32 and 33 are a first current control unit that controls the current flowing through the amplifier circuit 31 to a predetermined level.

The boosting constant current source 34 is disposed on a voltage supply line L3 that supplies a power supply voltage of +12 V. The boosting constant current source 34 is controlled to be turned on and off according to the slew rate switching signal SWS. When the boosting constant current source 34 is turned on, the voltage supply line L3 is connected in parallel to the voltage supply line L1, and the power supply voltage of +12 V is supplied to the amplifier circuit 31 via the voltage supply line L3 and the boosting constant current source 34. When the boosting constant current source 34 is turned off, the voltage supply line L3 is disconnected from the amplifier circuit 31, resulting in a state where the voltage of +12 V is not supplied via the voltage supply line L3 and the boosting constant current source 34.

The boosting constant current source 35 is disposed on a voltage supply line L4 that supplies a power supply voltage of −8 V. The boosting constant current source 35 is controlled to be turned on and off according to the slew rate switching signal SWS. When the boosting constant current source 35 is turned on, the voltage supply line L4 is connected in parallel to the voltage supply line L2, and the power supply voltage of −8 V is supplied to the amplifier circuit 31 via the voltage supply line LA and the boosting constant current source 35. When the boosting constant current source 35 is turned off, the voltage supply line L4 is disconnected from the amplifier circuit 31, resulting in a state where the voltage of −8 V is not supplied via the voltage supply line L4 and the boosting constant current source 35.

The boosting constant current sources 34 and 35 have a function to restrict the peak current of the amplifier circuit 31 to a predetermined current value by being turned on and off according to the slew rate switching signal SWS and being connected to the amplifier circuit 31. That is, the boosting constant current sources 34 and 35 are a second current control unit that controls the current flowing through the amplifier circuit 31 to a predetermined level.

In the embodiment, the base constant current source 32, the base constant current source 33, the boosting constant current source 34, and the boosting constant current source 35 each have an identical current capability. That is, when the boosting constant current source 34 is turned on based on the slew rate switching signal SWS, and the boosting constant current source 34 is connected in parallel to the base constant current source 32, the amount of the current flowing through the amplifier circuit 31 doubles compared with a state where the boosting constant current source 34 is turned off. Similarly, when the boosting constant current source 35 is turned on based on the slew rate switching signal SWS, and the boosting constant current source 35 is connected in parallel to the base constant current source 33, the amount of the current flowing through the amplifier circuit 31 doubles compared with a state where the boosting constant current source 35 is turned off.

Figure 5:
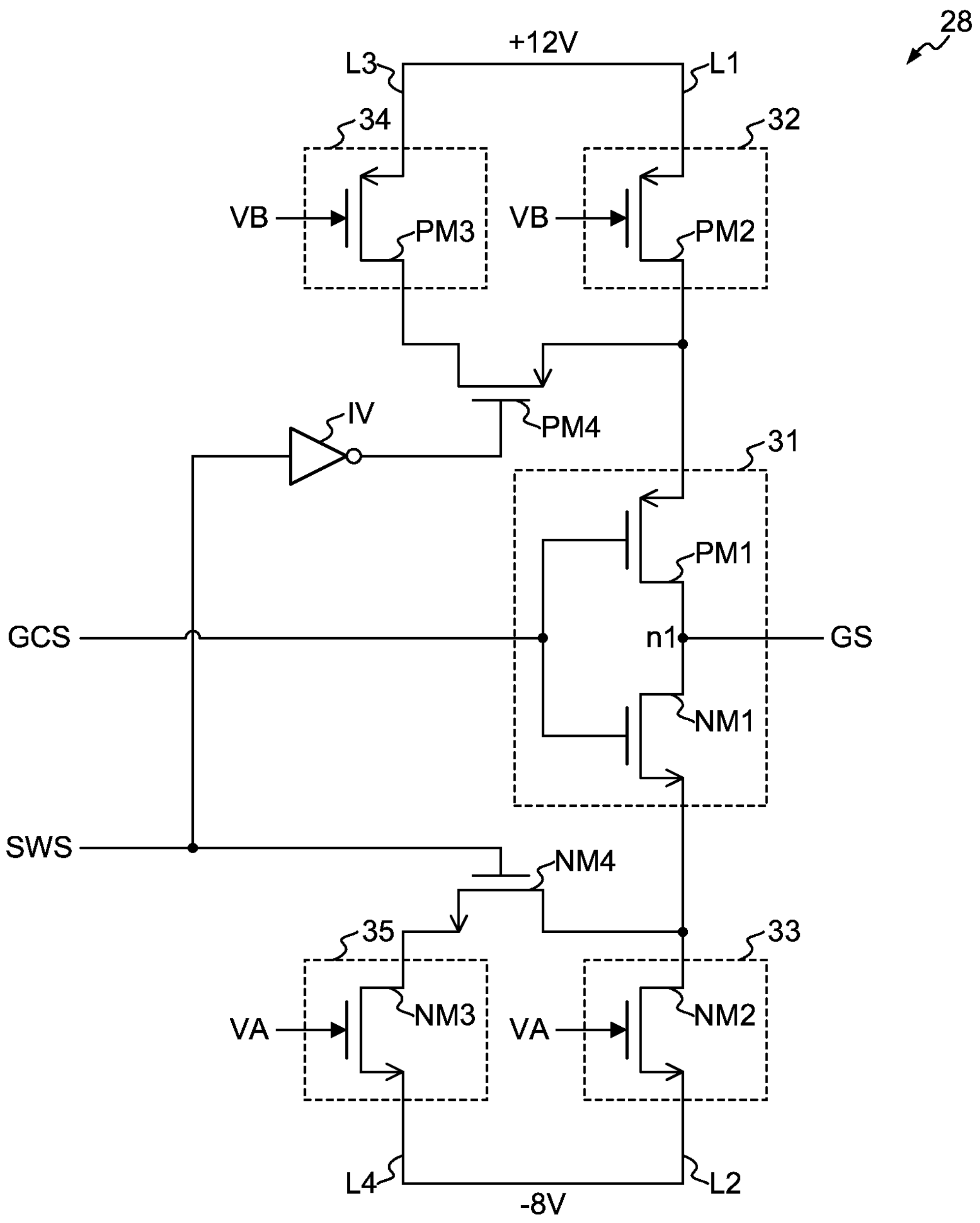
FIG. 5 is a circuit diagram illustrating a specific configuration of the output buffer of the embodiment.

FIG. 5 is a circuit diagram illustrating a specific configuration of the output buffer 28.

The amplifier circuit 31 is constituted of transistors PM1 and NM1. The transistor PM1 is a P-channel type MOS transistor (that is, PMOS transistor), which is of first conductivity type. The transistor NM1 is an N-channel type MOS transistor (that is, NMOS transistor), which is of second conductivity type. The transistors PM1 and NM1 have respective drains connected to one another via a node n1 as an output terminal of the gate control output GS.

The transistors PM1 and NM1 have respective gates to which the gate control signal GCS is applied as a common input signal. The transistors PM1 and NM1 are complementarily turned on and off according to a signal level of the gate control signal GCS.

The base constant current source 32 is constituted of a transistor PM2. The transistor PM2 is a P-channel type MOS transistor (that is, PMOS transistor), which is of first conductivity type. The transistor PM2 has a source connected to the voltage supply line L1 of +12 V. The transistor PM2 has a drain connected to the source of the transistor PM1. The transistor PM2 has a gate to which a bias voltage VB is applied.

The base constant current source 33 is constituted of a transistor NM2. The transistor NM2 is an N-channel type MOS transistor (that is, NMOS transistor), which is of second conductivity type. The transistor NM2 has a source connected to the voltage supply line L2 of −8 V. The transistor NM2 has a drain connected to the source of the transistor NM1. The transistor NM2 has a gate to which a bias voltage VA is applied.

The boosting constant current source 34 is constituted of a transistor PM3. The transistor PM3 is a P-channel type MOS transistor (that is, PMOS transistor), which is of first conductivity type. The boosting constant current source 34 has a source connected to the voltage supply line L3 of +12 V. The transistor PM3 has a gate to which the bias voltage VB is applied. The transistor PM3 has an identical size (gate width and gate length) to the transistor PM2.

The boosting constant current source 35 is constituted of a transistor NM3. The transistor NM3 is an N-channel type MOS transistor (that is, NMOS transistor), which is of second conductivity type. The boosting constant current source 35 has a source connected to the voltage supply line L4 of −8 V. The transistor NM3 has a gate to which the bias voltage VA is applied. The transistor NM3 has an identical size (gate width and gate length) to the transistor NM2.

Between the source of the transistor PM1 and the drain of the transistor PM3, a transistor PM4 is disposed as a selector switch for switching the slew rate. The transistor PM4 is constituted of a P-channel type MOS transistor (that is, PMOS transistor), which is of first conductivity type. The transistor PM4 has a source connected to the source of the transistor PM1. The transistor PM4 has a drain connected to the drain of the transistor PM3.

The transistor PM4 has a gate to which the slew rate switching signal SWS is applied via an inverter INV. That is, the transistor PM4 is turned on and off according to the signal level of the slew rate switching signal SWS. This switches connection and disconnection of the transistor PM3 that constitutes the boosting constant current source 34 to the amplifier circuit 31.

Between the source of the transistor NM1 and the drain of the transistor NM3, a transistor NM4 is disposed as a selector switch for switching the slew rate. The transistor NM4 is constituted of an N-channel type MOS transistor (that is, NMOS transistor), which is of second conductivity type. The transistor NM4 has a drain connected to the source of the transistor NM1. The transistor NM4 has a source connected to the drain of the transistor NM3.

The transistor NM4 has a gate to which the slew rate switching signal SWS is applied. That is, the transistor NM4 is turned on and off according to the signal level of the slew rate switching signal SWS. This switches connection and disconnection of the transistor NM3 that constitutes the boosting constant current source 35 to the amplifier circuit 31.

Figure 6:
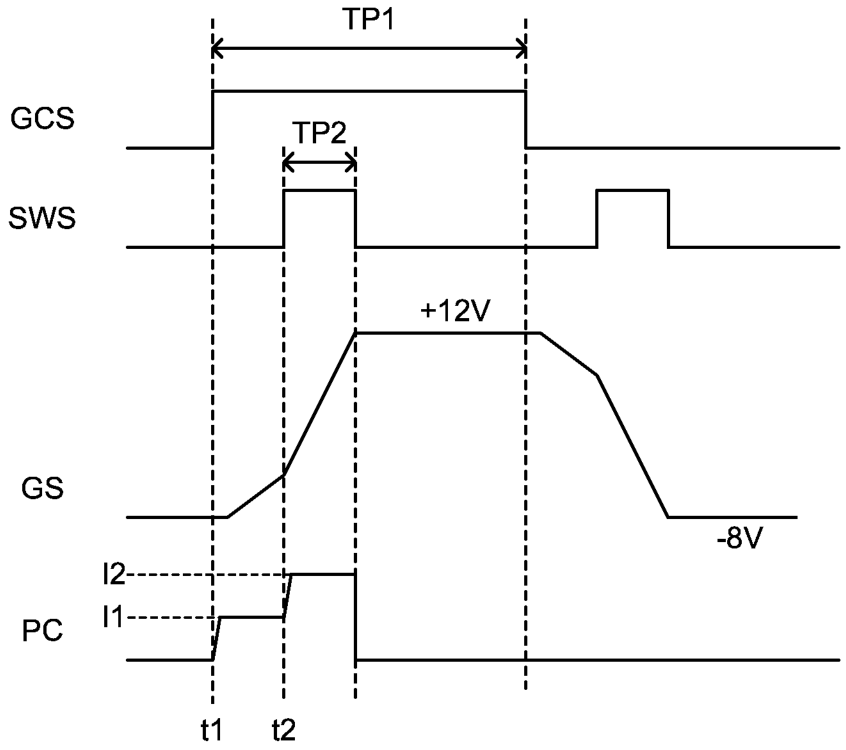
FIG. 6 is a diagram illustrating the gate control output and a peak current of the embodiment.

FIG. 6 is a diagram illustrating a change in gate control output and current during the slew rate switching operation. The gate control signal GCS is a signal that rises at a time t1 and becomes a logic level 1 (H level) over a time period TP1.

The slew rate switching signal SWS is a signal that rises at a time t2 delayed from that of the gate control signal GCS and becomes the logic level 1 (H level) over a time period TP2 shorter than the time period TP1.

When the gate control signal GCS rises at the time t1, the peak current flows through the amplifier circuit 31. The slew rate switching signal SWS is in a L level, and the boosting constant current sources 34 and 35 are disconnected from the amplifier circuit 31. In view of this, the value of a peak current PC is controlled to be a current value of "I1" by the base constant current sources 32 and 33.

Subsequently, when the slew rate switching signal SWS rises at the time t2, the respective transistors PM4 and NM4 are turned on, and the boosting constant current sources 34 and 35 are connected to the amplifier circuit 31. This causes the value of the peak current PC to be a current value of "I2." In the embodiment, since the base constant current sources 32 and 33 and the boosting constant current sources 34 and 35 have an identical current capability, the current value I2 is approximately twice as large as the current value I1.

Focusing on the amount of variation in current, the amount of variation when the current changes from a current value 0 to the current value I1 is identical to the amount of variation when the current changes from the current value I1 to the current value I2. Accordingly, the magnitude of noise generated when the current changes from the current value I1 to the current value I2 is equal to the magnitude of noise generated when the current changes from the current value 0 to the current value I1. In other words, the noise having an identical magnitude is generated each at a first phase of current change (0→I1) and at a second phase of current change (I1→I2).

Thus, with the configuration of the output buffer 28 of the embodiment, changing the current value in two phases of 0→I1→I2 allows doubling the amount of variation in current itself (I2=2×I1) and suppressing the magnitude of the noise generated due to the variation to be equivalent to the magnitude of the noise generated when the current value is changed from 0 to I1.

The gate control output GS has a signal waveform that changes in two phases in response to the rise of the gate control signal GCS and the signal change of the slew rate switching signal SWS.

The output buffer 28 of the embodiment allows suppressing the peak current (that is, the amount of instantaneous variation in current) while suppressing the decrease in the slew rate of the amplifier circuit 31 by thus changing the peak current and the gate control output GS in two phases using the slew rate switching signal SWS. This will be described below with reference to comparative examples.

Figure 7A:
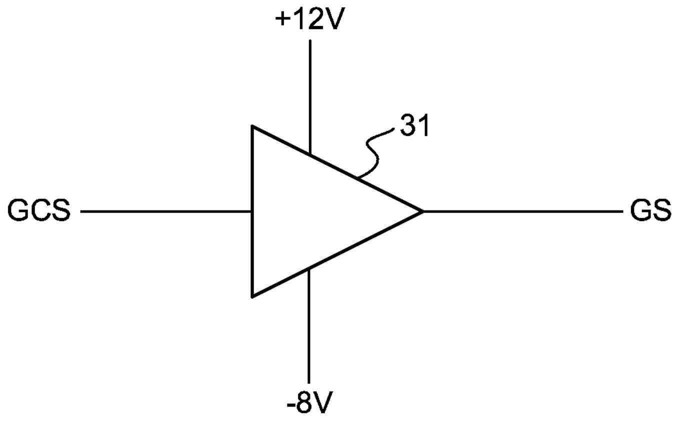
FIG. 7A is a diagram illustrating a configuration of an output buffer of a first comparative example.
Figure 7B:
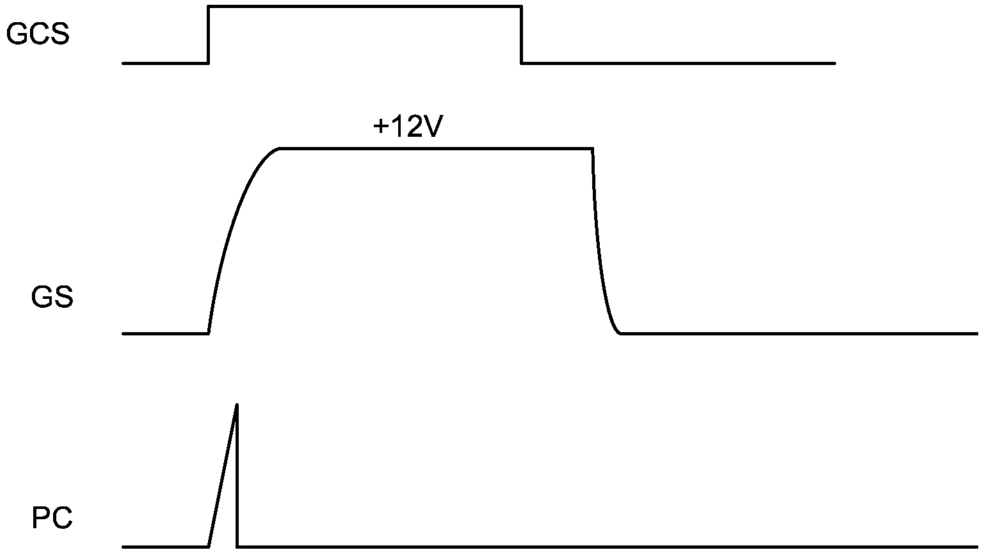
FIG. 7B is a diagram illustrating a gate control output and a peak current of the first comparative example.

FIG. 7A is a diagram illustrating, as a first comparative example, a configuration of an output buffer that does not have any of the base constant current sources or boosting constant current sources, which are included in the embodiment. In the output buffer of the first comparative example, the current value is not restricted by the constant current sources. In view of this, as illustrated in FIG. 7B, the peak current PC flowing through the amplifier circuit 31 has a current waveform that exhibits a large current value instantaneously in response to the rise of the gate control signal GCS. Thus, since the current value of the peak current PC instantaneously increases, noise caused by the peak current PC is generated in the output buffer of the first comparative example.

Figure 8A:
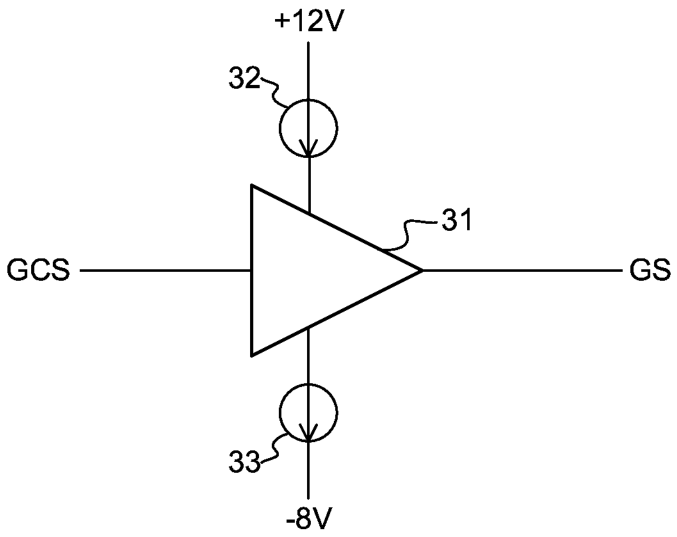
FIG. 8A is a diagram illustrating a configuration of an output buffer of a second comparative example.
Figure 8B:
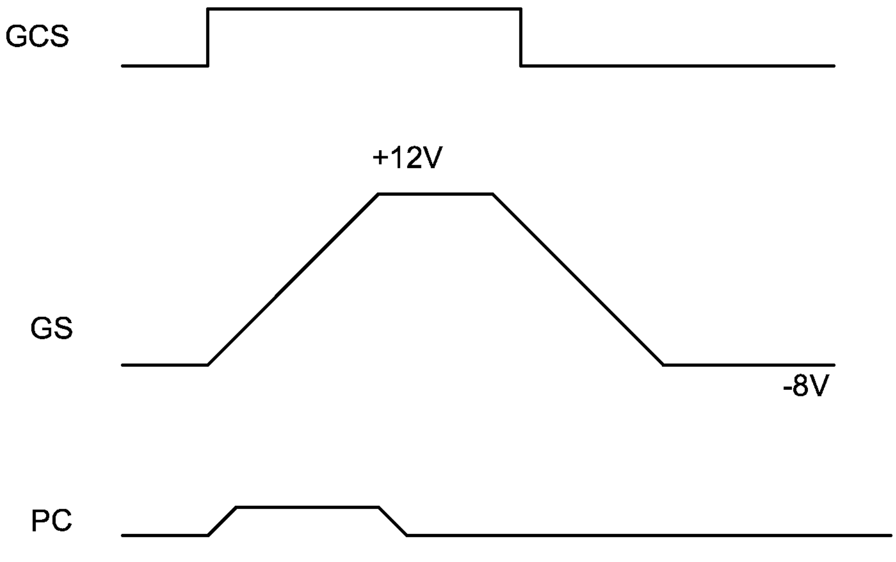
FIG. 8B is a diagram illustrating a gate control output and a peak current of the second comparative example.

FIG. 8A is a diagram illustrating, as a second comparative example, a configuration of an output buffer in which the base constant current sources 32 and 33 are disposed for suppressing the peak current PC. In the output buffer of the second comparative example, the base constant current sources 32 and 33 are connected to the amplifier circuit 31, and the current value of the peak current PC is restricted. In view of this, as illustrated in FIG. 8B, the current value of the peak current PC becomes small, suppressing a change in the current value. Accordingly, unlike the first comparative example, the generation of noise caused by the peak current PC can be suppressed.

However, in the second comparative example, the gate control output GS has a signal waveform that exhibits a gradual change with a dull rise in association with the suppression of the peak current PC. That is, in the configuration of the second comparative example, although the peak current PC can be suppressed, the slew rate of the amplifier circuit 31 decreases.

In contrast to this, the output buffer 28 of the embodiment allows the signal of the gate control output GS to change in two phases by changing the peak current PC in two phases as illustrated in FIG. 6 and allows the signal waveform thereof to be closer to the signal waveform in a case without current restriction by the constant current sources. In addition, the output buffer 28 of the embodiment allows suppressing the generation of noise caused by the peak current PC, that is, the generation of noise caused by an instantaneous change in current, to be equivalent to that of the second comparative example by changing the peak current PC in two phases.

Accordingly, the output buffer 28 of the embodiment allows suppressing the amount of instantaneous variation in current and the magnitude of noise generated due to the amount of instantaneous variation in current while suppressing the decrease in the slew rate of the amplifier circuit 31.

The disclosure is not limited to the above-described embodiment. For example, in the above-described embodiment, a case where the base constant current sources 32 and 33 and the boosting constant current sources 34 and 35 each have an identical current capability is described as an example. However, unlike this, for example, by configuring the transistor PM2 to have a different size from the transistor PM3 and configuring the transistor NM2 to have a different size from the transistor NM3, the base constant current sources 32 and 33 may be configured to have a different current capability from the boosting constant current sources 34 and 35. At that time, the current capabilities of the boosting constant current sources 34 and 35 is preferably set to be lower than the current capability of the base constant current sources 32 and 33. By thus setting the current capabilities, the magnitude of the noise caused by the current variation can be suppressed to the extent equal to the configuration having only the base constant current sources (for example, the above-described second comparative example).

What is claimed is:

1. A display device comprising:

a display panel that includes a plurality of data lines, a plurality of gate lines, and a plurality of pixel portions disposed in a matrix at respective intersecting portions between the plurality of data lines and the plurality of gate lines;

a display controller that outputs a video data signal indicating video displayed on the display panel;

a gate driver that supplies a gate signal to the plurality of gate lines; and a source driver that receives the video data signal from the display controller, supplies a gradation voltage signal to the plurality of pixel portions via the plurality of data lines based on the video data signal, and supplies a gate control signal for controlling an operation of the gate driver to the gate driver, wherein the source driver includes:

a gate control unit that generates the gate control signal; and an output buffer that amplifies the gate control signal and outputs the amplified gate control signal, and the output buffer includes:

an amplifying unit that operates in response to application of a first power supply voltage and a second power supply voltage, amplifies the gate control signal, and outputs the amplified gate control signal;

a first current control unit that includes a first constant current source and a second constant current source, the first constant current source being disposed on a first supply line that supplies the first power supply voltage to the amplifying unit, the second constant current source being disposed on a second supply line that supplies the second power supply voltage to the amplifying unit; and a second current control unit that includes a third constant current source and a fourth constant current source, the third constant current source being connected in parallel to the first supply line, supplying the first power supply voltage to the amplifying unit, and allowing turning on and off the supply, the fourth constant current source being connected in parallel to the second supply line, supplying the second power supply voltage to the amplifying unit, and allowing turning on and off the supply.

2. The display device according to claim 1, wherein the source driver receives supply of a frame synchronizing signal from the display controller, and the gate control unit generates a switching signal for switching on and off the third constant current source and the fourth constant current source based on the frame synchronizing signal and supplies the switching signal to the second current control unit.

3. The display device according to claim 1, wherein the first constant current source, the second constant current source, the third constant current source, and the fourth constant current source each have an identical current capability.

4. A source driver that is connected to a display panel, receives supply of a video data signal from a display controller, supplies a gradation voltage signal to a plurality of pixel portions via a plurality of data lines based on the video data signal, and supplies a gate control signal to a gate driver, the display panel including the plurality of data lines, a plurality of gate lines, and the plurality of pixel portions disposed in a matrix at respective intersecting portions between the plurality of data lines and the plurality of gate lines, the gate control signal controlling an operation of the gate driver that supplies a gate signal to the plurality of gate lines, the source driver comprising:

a gate control unit that generates the gate control signal; and an output buffer that amplifies the gate control signal and outputs the amplified gate control signal, wherein the output buffer includes:

an amplifying unit that operates in response to application of a first power supply voltage and a second power supply voltage, amplifies the gate control signal, and outputs the amplified gate control signal;

a first current control unit that includes a first constant current source and a second constant current source, the first constant current source being disposed on a first supply line that supplies the first power supply voltage to the amplifying unit, the second constant current source being disposed on a second supply line that supplies the second power supply voltage to the amplifying unit; and a second current control unit that includes a third constant current source and a fourth constant current source, the third constant current source being connected in parallel to the first supply line, supplying the first power supply voltage to the amplifying unit, and allowing turning on and off the supply, the fourth constant current source being connected in parallel to the second supply line, supplying the second power supply voltage to the amplifying unit, and allowing turning on and off the supply.

5. The source driver according to claim 4, wherein the source driver receives supply of a frame synchronizing signal from the display controller, and the gate control unit generates a switching signal for switching on and off the third constant current source and the fourth constant current source based on the frame synchronizing signal and supplies the switching signal to the second current control unit.

6. The source driver according to claim 4, wherein the first constant current source, the second constant current source, the third constant current source, and the fourth constant current source each have an identical current capability.

* * * * *